Oct. 29, 1957  A. L. LADO  2,811,139
POWER TRANSMISSION DEVICE
Filed July 7, 1949  2 Sheets-Sheet 1
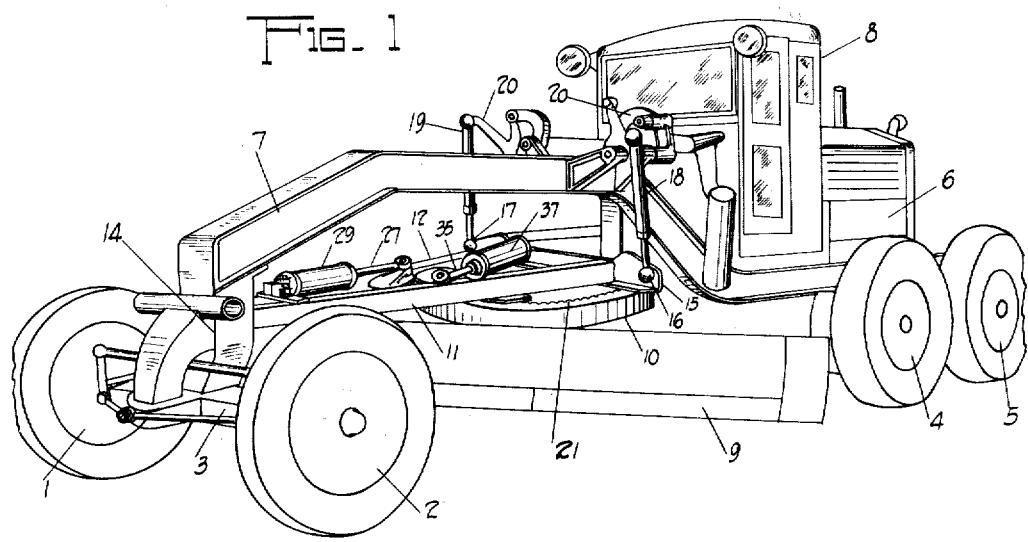
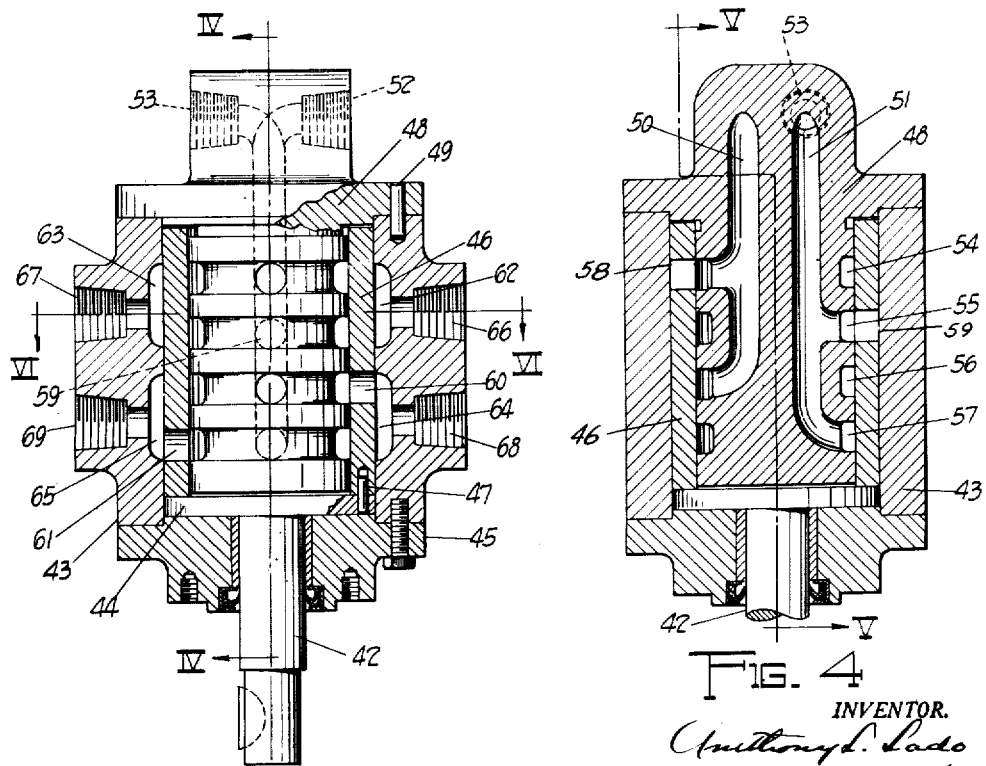
INVENTOR.
Anthony L. Lado
BY Hauxyod Vantorn
his Attys.

Oct. 29, 1957 A. L. LADO 2,811,139
POWER TRANSMISSION DEVICE
Filed July 7, 1949 2 Sheets-Sheet 2
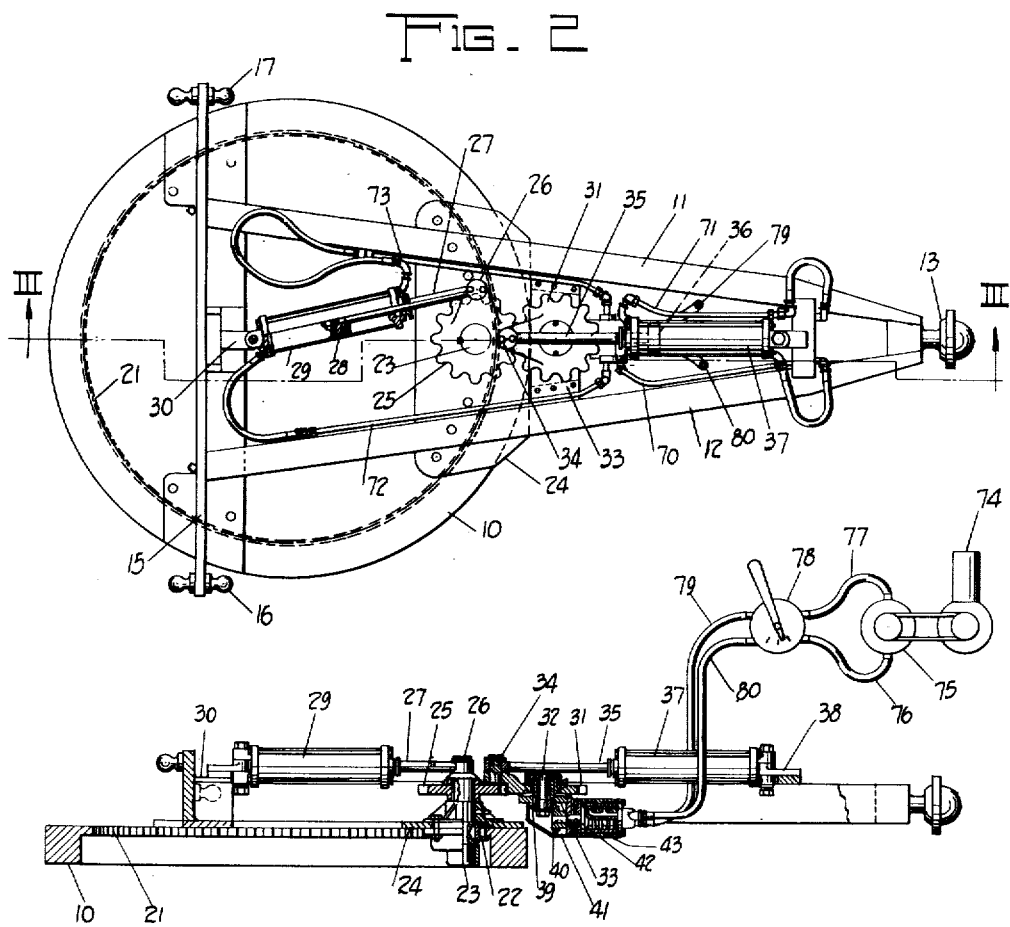
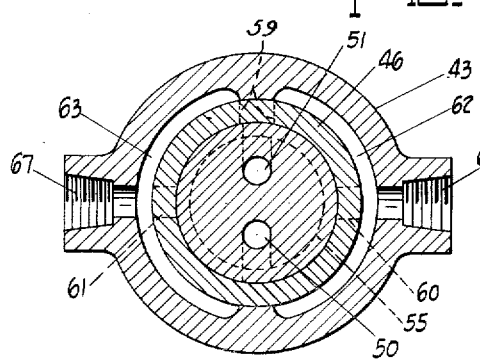
INVENTOR.
Anthony L. Lado
BY

United States Patent Office 2,811,139
Patented Oct. 29, 1957

2,811,139
POWER TRANSMISSION DEVICE

Anthony L. Lado, Rome, N. Y., assignor, by mesne assignments, to Rome Grader Corporation, Rome, N. Y., a corporation of Ohio Application July 7, 1949, Serial No. 103,409

9 Claims. (Cl. 121—63)

This invention relates to power transmission devices.

An object of the invention is to provide an improved power transmission device which is capable of moving heavy pieces of equipment or other articles.

Another object of the invention is to provide an improved power transmission device which will occupy little space.

Another object of the invention is to provide an improved power transmission device which will be composed of few and simple parts.

Another object of the invention is to provide an improved power transmission device which will be extremely rugged and durable in construction.

Another object of the invention is to provide an improved power transmission device which may move an object into any one of a large number of positions.

Another object of the invention is to provide an improved power transmission device which may effectively hold an object in any position into which it has been moved.

Other objects will hereinafter appear.

The invention will be better understood from the description of one practical embodiment, that chosen for the sake of illustration being one which is known as a "circle drive" for a power driven grader, this embodiment being illustrated in the accompanying drawings, in which Figure 1 is a perspective view of a grader including the above mentioned circle drive;

Figure 2 is a plan view, to an enlarged scale, of the circle and its supporting mechanism of Figure 1;

Figure 3 is a central sectional view taken on the line III—III of Figure 2;

Figure 4 is an enlarged central sectional view of the valve mechanism shown in Figure 3;

Figure 5 is a central sectional view of the valve mechanism of Figure 4 taken on the line V—V thereof; and Figure 6 is a transverse sectional view taken on the line VI—VI of Figure 5.

As illustrated in Figure 1, the grader shown is an automotive vehicle mounted on six wheels, the front pair 1 and 2 being connected by an axle 3 upon which they are dirigibly mounted, while the two rear pairs of wheels 4 and 5 are mounted on driven axles, concealed under the mechanism of the drawing, and driven by an internal combustion motor or other prime mover within a cowling or hood 6.

The axles support a longitudinally extending central frame 7, to which the motor above referred to is connected, and which carries forward thereof a cab 8 for protecting the operator and enclosing the controls for the mechanism.

The frame 7, between the axle 3 and cab 8, is shown as arched upwardly to afford a space for the adjustable scraping blade 9 and its controlling, supporting and adjusting mechanism.

The blade 9 is secured to the underside of a rotatable ring or circle 10 which is pivotally carried on the underside of a triangular frame consisting of side members 11 and 12 joined at their front end by ball and socket joint 13 which is secured to the forward end of frame 7 within the depending bracket 14, by which the front axle is also connected to the frame.

The rear ends of members 11 and 12 are connected by a transverse member 15 provided at its ends with ball and socket joints 16 and 17, to which, in turn, are pivoted links 18 and 19, respectively, supported and operated by arms 20 which may be rotated from within the cab 8 by manual or any other desired source of power to raise or lower the rear end of the triangular frame, thus raising or lowering the blade 9, or to raise one side of this frame more than the other and thus to tilt the blade 9 with respect to the frame 7 and other parts of the vehicle.

To rotate the circle 10 upon its supporting frame consisting of members or beams 11, 12 and 15, I have provided internal gear teeth 21 within the circle 10, these teeth meshing with those of a pinion or sprocket 22 carried by a short vertical shaft 23 which is journalled in a plate 24 extending transversely of and secured to the bottom surfaces of beams 11 and 12.

Fixed to the upper end of shaft 23 is a gear or sprocket 25 carrying a crank 26.

The crank is connected to one end of a piston rod 27 carrying a piston 28 movable within a cylinder 29 pivoted, as at the bracket 30, to the transverse beam 15, the piston, rod and cylinder constituting a hydraulic jack.

In mesh with gear 25 is a similar gear 31 mounted on a shaft 32 journalled in a transverse plate 33 secured to members 11 and 12.

The gear 31 is provided with a crank 34 pivoted to the end of a piston rod 35 which carries a piston 36 operating in a cylinder 37, these constituting a second hydraulic jack.

This cylinder is also pivotally supported from the triangular supporting frame upon a bracket 38 spanning the space between side beams 11 and 12.

As viewed in Fig. 2, it will be seen that the axis of circle 10 and the axis of the shaft 32, as well as the axes of the cylinder pivot pins carried in the brackets 30 and 38, all lie in the same plane along the frame. It will be noted, too, that the cranks 26 and 34 to which the outer ends of the piston rods 27 and 35, respectively, are connected, cannot both be in alignment with the pivots of the cylinders 29 and 37 and the axis of the circle at the same time. In this manner not only are objectionable dead centers avoided, but the power transmission mechanism thus provided for rotating the circle upon its supporting farme will effectively hold an object mounted on the circle in any position into which it has been moved.

The lower end of shaft 32 projecting below plate 33 has keyed to it a bevel gear 39 which meshes with a second bevel gear 40, both being enclosed within a housing 41.

Bevel gear 40 is keyed to the end of the shaft 42 of the valve mechanism supported in a generally cylindrical casing 43 which is fastened to the bevel gear housing 41.

Shaft 42 terminates in a flat disc-like head 44 resting upon the closure or head 45 of valve casing 43, and to head 44 is secured to rotate with it a valve sleeve 46, this being shown as secured by dowels 47 extending into the sleeve 46 and through head 44.

Within the valve sleeve 46 is a valve body indicated generally at 48, which extends beyond and covers and is fixed to the end of casing 43, it being secured against rotation in relation to this casing by dowels 49.

The valve body 48 has formed within it two passages 50 and 51 parallel its axis; the outer ends of these passages 52 and 53 are provided with pipe threads or otherwise suitably formed for the connection of these passages to suitable flexible conduits by which fluid may be admitted to and discharged from passages 50 and 51.

The outer surface of valve body 43 is provided with four annular grooves 54, 55, 56 and 57 respectively; grooves 54 and 56 communicate with passage 50, while grooves 55 and 57 communicate with passage 51.

The outer surface of the body 48, of course, fits closely within sleeve 46, so that they may turn relatively but preclude any significant leakage of fluid.

Through sleeve 46 are formed diametrically opposite ports 58 and 59 in alignment respectively with grooves 54 and 55, and on a diameter at right angles to this diameter are ports 60 and 61 respectively in alignment with grooves 56 and 57.

Within opposite sides of the body 43 are recesses 62, 63, 64 and 65 communicating with ports 66, 67, 68 and 69, respectively, and as shown as screw threaded for connection with conduits 70, 71, 72 and 73, also respectively, portions of which are shown as of piping and other portions of flexible tubing, and which communicate with opposite ends of cylinders 29 and 37.

It will be noted that sleeve 46 makes one revolution to each revolution of gear 31, and therefore also to each revolution of gear 25, and it will also be noted that gears 25 and 31 are so meshed that their respective cranks will never be on center at the same time, but that when one is on center the other is substantially 90° off center.

Thus, the hydraulic jacks or cylinders 29 and 37 and their associated gears constitute in effect two oscillating engines so geared that each carries the other past center, and that their joint power is transmitted to the internal gear 21 to rotate the circle 10.

The rotation of sleeve 46, being synchronized with both pistons, reverses the flow of liquid in the cylinders as these reach the end of their respective strokes, and the mechanism may drive the circle through any part of a revolution or through a plurality of revolutions if desired, the direction of the drive being easily reversed by the controls in the cab reversing the admission of fluid from port 52 to port 53 or vice versa.

The means for supplying fluid under pressure is very diagrammatically illustrated in Figure 3. In this figure, a source of power such as an internal combustion engine 74 is indicated which may be the vehicle propelling engine in hood 6, or a separate engine, as desired, this driving a pump 75 having an inlet connected to a conduit 76 and an outlet connected to a conduit 77 both conduits being shown as connected to the manually operated reversing valve 78, which, in turn, is connected to conduits 79 and 80 communicating with ports 52 and 53, respectively.

It will be apparent that actuation of the valve 78 will selectively connect the pump outlet conduit 77 to either conduit 79 or 80, thus delivering fluid under the pressure imparted to it by the pump 75 to either port 52 or 53 as desired, and at the same time permitting exhaust fluid to be discharged through the other of said ports 53 or 52, as the case may be, to conduit 76 communicating with the intake side of the pump.

When it is desired to maintain the blade in any adjusted position, it is only necessary to turn valve 78 to a position in which it closes the ends of both conduits 79 and 80.

It will be noted that the entire driving mechanism is extremely simple and compact, fitting partly between the triangular frame side members 11 and 12 and extending only slightly above the same. Also, due to the arrangement of the two hydraulic jacks being such that at least one has at all times substantially its maximum leverage on its crank, and due also to the large forces which may be obtained through the hydraulic transmission of power, the blade, even though quite heavy, may readily be shifted at all times, and may simply be locked in position by closing the valves, thus retaining both cylinders full of fluid, which, of course, is preferably a substantially incompressible oil.

The need for any mechanical connections with the blade or other parts carried by the triangular frame to control its position is eliminated, and the jacks are simply controlled by pressure delivered through two flexible conduits.

While I have described the illustrated embodiments of my invention in some particularity, and have shown it as applied to the circle drive of a grader, it is obvious that many other embodiments, variations and modifications will readily occur to one skilled in this art, and that the drive may be used for many other purposes, such for instance as a driving unit or a transmission between engines and driving wheels, or between pluralities of driving wheels, and in many other uses, and that such applications will readily occur to those skilled in this art, and I therefore do not limit myself to the precise details shown and described herein, but claim as my invention all embodiments, modifications and variations coming within the scope of the appended claims.

I claim:

1. A power transmission device comprising two hydraulically operated oscillating double acting engines each including a cylinder, piston, piston rod, and crank shaft, a gear fixed to the crank shaft of each engine, the axes of both cylinders oscillating in the same plane, the gears meshing directly with one another with their cranks relatively angularly disposed, a valve connected to one of said crank shafts, and conduit means from said valve to both cylinders.

2. A power transmission device comprising two hydraulically operated oscillating double acting engines each including a cylinder, piston, piston rod, and crank shaft, a gear fixed to the crank shaft of each engine, the axes of both cylinders oscillating in the same plane, the gears meshing directly with one another with their cranks relatively angularly disposed, a rotary valve connected to one of said crank shafts, and conduit means from said valve to both cylinders.

3. A power transmission means comprising two oscillating double acting engines each including a cylinder, a piston, a connecting rod, and a crank shaft, each shaft having fixed to it a gear, the gears of the shafts intermeshing directly with one another and having equal numbers of teeth, the axes of both cylinders oscillating in the same plane, a power take-off connected to one of said shafts, a rotating valve connected to one of said shafts, conduit means from said valve to both ends of each of said cylinders, a source of fluid pressure connected to said valve, and means controlling the supply of fluid pressure to the valve.

4. A power transmission device comprising two cylinders each containing a piston and having a projecting piston rod, the cylinders being pivotally mounted to oscillate about parallel axes so that in all positions of oscillation the axes of both the cylinders lie in a single plane normal to the axes of the pivots, a pair of meshing gears between the cylinders and directly interfitting with one another, a crank fixed to one gear and pivotally connected to one of the piston rods, a crank fixed to the other gear and pivotally connected to the other piston rod, and a drive shaft fixed to one of said gears.

5. A power transmission device comprising two cylinders each containing a piston and having a projecting piston rod, the cylinders being pivotally mounted to oscillate about parallel axes so that in all positions of oscillation the axes of both the cylinders lie in a single plane normal to the axes of the pivots, a pair of meshing gears between the cylinders and directly interfitting with one another, a crank fixed to one gear and pivotally connected to one of the piston rods, a crank fixed to the other gear and pivotally connected to the other piston rod, a drive shaft fixed to one of said gears, valve mechanism connected to one of said gears and conduit means connecting the valve mechanism to both cylinders and to a source of fluid under pressure.

6. A power transmission device comprising two cylinders each containing a piston and having a projecting piston rod, the cylinders being pivotally mounted to oscillate about parallel axes so that in all positions of oscillation the axes of both the cylinders lie in a single plane normal to the axes of the pivots, a pair of meshing gears between the cylinders and directly interfitting with one another, a crank fixed to one gear and pivotally connected to one of the piston rods, a crank fixed to the other gear and pivotally connected to the other piston rod, a drive shaft fixed to one of said gears, valve mechanism connected to one of said gears, and conduit means connecting the valve mechanism to both ends of both cylinders and to a source of fluid under pressure.

7. A power transmission device comprising two double acting hydraulic motors each including a cylinder, a piston, a piston rod, and a crank shaft, a gear fixed to the crank shaft of each motor, the axes of both cylinders oscillating in the same plane, the gears meshing directly with one another with their cranks relatively angularly disposed, a valve connected to one of said crank shafts, and conduit means from said valve to both cylinders.

8. A power transmission device comprising two double acting hydraulic motors each including a cylinder, a piston, a piston rod and a crank shaft, a gear fixed to the crank shaft of each motor, the axes of both cylinders oscillating in the same plane, the gears meshing directly with one another with their cranks relatively angularly disposed, a rotary valve connected to one of said crank shafts and conduit means from said valve to both cylinders.

9. A power transmission means comprising two double acting oscillating hydraulic motors each including a cylinder, a piston, a connecting rod and a crank shaft, each shaft having fixed thereto a gear, the gears of the respective shafts intermeshing directly with one another and having equal numbers of teeth thereon, the axes of both cylinders oscillating in the same plane, a power take-off connected to one of said shafts, a rotating valve connected to one of said shafts, conduit means from said valve to both ends of each of said cylinders, a source of fluid pressure connected to said valve, and means controlling the supply of fluid pressure to the valve.

References Cited in the file of this patent

UNITED STATES PATENTS

| | | |
|---|---|---|
| 131,135 | Thompson | Sept. 3, 1872 |
| 856,651 | Murphy | June 11, 1907 |
| 1,286,122 | Sargent | Nov. 26, 1918 |
| 1,400,236 | Pfeffer | Dec. 13, 1921 |
| 1,839,085 | Carrey | Dec. 29, 1931 |
| 2,195,306 | Henry et al. | Mar. 26, 1940 |
| 2,195,607 | Wilson | Apr. 2, 1940 |
| 2,340,169 | Arndt | Jan. 25, 1944 |

FOREIGN PATENTS

| | | |
|---|---|---|
| 4,421 | Great Britain | 1880 |

UNITED STATES PATENT OFFICE

CERTIFICATE OF CORRECTION

Patent No. 2,811,139 October 29, 1957

Anthony L. Lado

It is hereby certified that error appears in the above numbered patent requiring correction and that the said Letters Patent should read as corrected below.

In the grant, lines 2 and 3, for "Rome Grader Corporation, of Rome, New York, a corporation of Ohio," read --Pettibone New York Corporation, a corporation of New York,--; line 12, for "Rome Grader Corporation, its successors" read --Pettibone New York Corporation, its successors--; in the heading to the printed specification, lines 4 and 5, for "Rome Grader Corporation, Rome, N. Y., a corporation of Ohio" read --Pettibone New York Corporation, a corporation of New York--.

Signed and sealed this 3rd day of December 1957.

(SEAL)
Attest:

KARL H. AXLINE

Attesting Officer

ROBERT C. WATSON
Commissioner of Patents